(No Model.)

L. NEWCOMB.
ORE SEPARATOR AND AMALGAMATOR.

No. 364,844. Patented June 14, 1887.

WITNESSES:
Marion E. Brown
Frances M. Brown

INVENTOR:
Levi Newcomb
per
Brown Brothers
Attorneys.

N. PETERS, Photo-Lithographer, Washington, D. C.

UNITED STATES PATENT OFFICE.

LEVI NEWCOMB, OF BOSTON, MASSACHUSETTS.

ORE SEPARATOR AND AMALGAMATOR.

SPECIFICATION forming part of Letters Patent No. 364,844, dated June 14, 1887.

Application filed June 1, 1886. Serial No. 203,803. (No model.)

*To all whom it may concern:*

Be it known that I, LEVI NEWCOMB, of Boston, in the county of Suffolk and State of Massachusetts, have invented certain new and useful Improvements in Ore Separators and Amalgamators, of which the following is a full, clear, and exact description.

This improved ore separator and amalgamator is composed of a tank or receptacle having two end walls and two inclining walls meeting at and along their lower edges at an angle, a water chamber or tank located at and along the lower portion of one of the so-inclining walls, which is connected to a suitable water-supply and has a series of perforations or jet-holes for the discharge of water therefrom into the tank in directions parallel, or substantially so, with the upward direction of the other inclining wall of the tank, in combination with mechanism for agitating or stirring the ore placed in said tank to open it out, to separate it, and to expose its gangue more perfectly and completely to the action of the jets or streams of water issuing from the perforations of said tank, and an amalgamating plate or surface or surfaces located across the pathway in which the water enters into the tank and travels to be discharged from the tank, substantially as hereinafter described and claimed.

Figure 1:
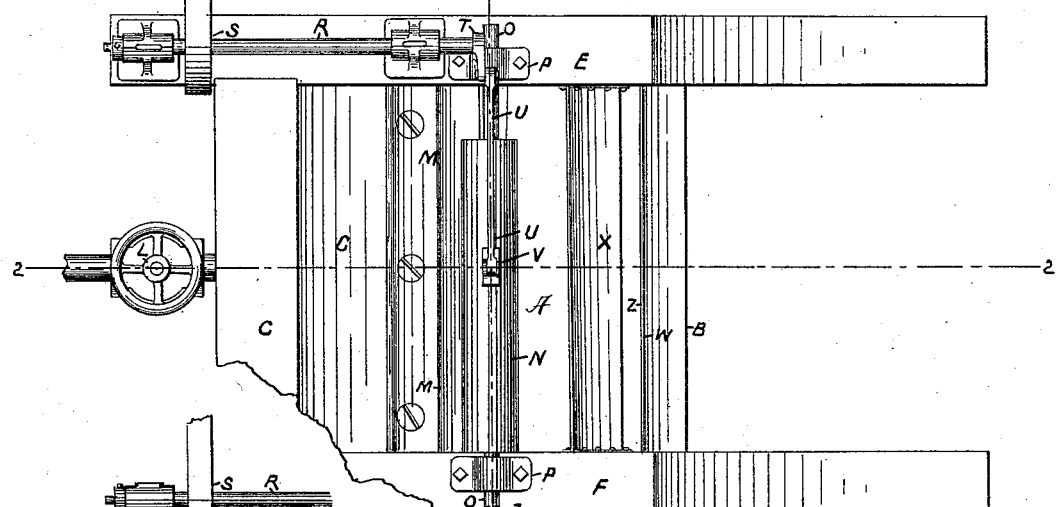
Figure 2:
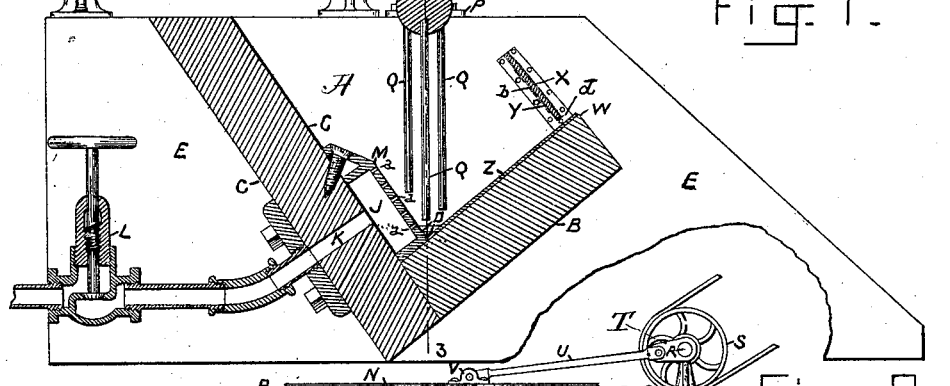
Figure 3:
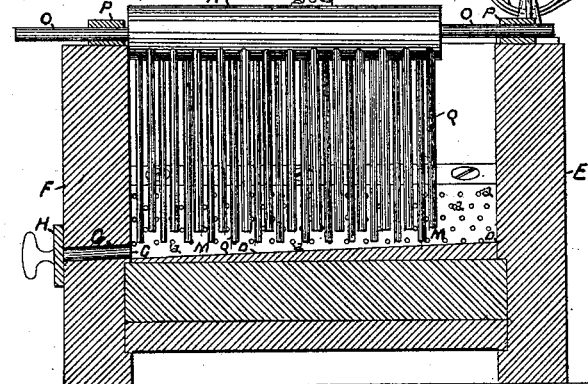

In the drawings forming a part of this specification, Figure 1 is a plan view of the improved ore separator and amalgamator. Fig. 2 is a longitudinal vertical section on line 2 2, Fig. 1; and Fig. 3 is a transverse vertical section on line 3 3, Fig. 2.

In the drawings, A represents the ore tank or receptacle, and B and C its two vertically-inclining walls, which meet at their lower edges at an angle and there form a gutter, D, which inclines from the end wall, E, of the tank to its opposite end wall, F, leading to a discharge-opening, G, through said end wall, F, for the discharge of the mineral or heavier portions of the ore placed in the tank A, and which have been separated from the gangue in the operation of the devices or parts of this invention, as will hereinafter appear.

H is a lid to close the outer end of the mineral-discharge opening G of the tank, and which is secured to the end wall, F, of the tank in proper position to be capable of being swung to cover or open said discharge-passage.

J is a water tank or chamber forming a part of one, C, of the inclining walls B C of the tank at the lower portion thereof.

K is a pipe for entering water into said water-tank, and is connected to any suitable supply, and L is a valve for opening and closing the water-supply pipe K.

*a a* are a series of perforations or jet-holes in the upper wall, M, of the water-tank—that is, its wall toward the inclining wall B of the ore-tank which is opposite to the wall C at which the water-tank is placed—and these perforations or jet-holes are arranged for the water to discharge therefrom in upward directions—that is, substantially parallel with the upward direction of the inclining wall B of the tank.

N is a horizontal shaft at the upper portion of the ore-tank, extending across from end to end of the tank, and at each end is supported by journals O in bearing-blocks P upon the upper edge of the end walls, through which it is free to play lengthwise. This shaft extends in a direction coincident with that of the gutter D of the ore-tank, and it is provided with rows of vertical radial finger-rods Q, projecting from it downward into the ore-tank and terminating near and just over the gutter of the inclining walls. These finger-rods, as shown, are in three separate rows, and each row extends from end to end of the shaft and the finger-rods of each row are opposite the spaces between the finger-rods of the row next adjoining. This shaft N and its finger-rods Q constitute the ore agitator or stirrer of the ore-separator, and for that purpose the shaft is reciprocated in its bearing-blocks P by any mechanism suitable therefor. One arrangement of such mechanism is shown, and it consists of a horizontal shaft, R, having pulley-wheel S belted and driven in any suitable manner from a driving-shaft suitably arranged therefor; and this shaft R has a crank-arm, T, connected by a pitman-rod, U, to a block, V, fastened to the finger-rod shaft N.

The rotation of the shaft R, driven as stated, and the mechanism described as connecting said shaft with the finger-rod shaft N, secure a lengthwise reciprocation of the shaft N through its bearing-blocks P, and thereby a corresponding movement of the finger-rods along the length of the gutter D of the tank. This movement of the finger-rods agitates and stirs the ore in the tank, opening and separating it to the action and movement of the water discharged from the jet-holes $a$ into the tank.

The water entered into the tank, as above described, overflows at the upper edge, W, of the inclining wall B of the tank, carrying with it the lighter portions or gangue, while the heavier portions settle in the lower part of the tank at and along the gutter D, from which they are removed from time to time at the discharge-opening G.

X is an amalgamating-plate of any suitable material or nature. This plate X extends from end to end of the ore-tank, at right angles to its inclined wall B, and has its lower edge, $d$, dipping below the water-level of the tank, or, in other words, below the level of the edge W of the tank over which the water and its contained gangue pass in being discharged. This plate X at each end sits in a groove, $b$, of the end walls of the tank, and thus it is made capable of removal and replacement or of the substitution of another for it at pleasure.

In the operation of the machine described, having an amalgamating-plate arranged as described, the water on passing to the edge W of the tank to escape with its contained gangue is forced to pass under the edge $d$ of the amalgamating-plate X, first coming in contact with the face Y of said plate, which, being an amalgamating surface, obviously secures the retention, and consequently the saving, of such light mineral portions as may happen to be mixed with or unseparated from the gangue and its water. The inclining wall B of the ore-tank is also made, by preference, an amalgamating-surface by placing an amalgamated copper sheet, Z, thereon, as is shown in Fig. 2 more particularly.

Having thus described my invention, what I claim, and desire to secure by Letters Patent, is—

1. A tank or receptacle, A, having end walls, E F, inclining walls B C, meeting at D, and a water-tank, J, having perforations or jet-holes $a$ near the lower portion of wall C, in combination with finger-rods or agitators Q, and a reciprocating shaft, N, substantially as described.

2. A tank or receptacle, A, having end walls, E F, inclining walls B C, meeting at D, and a water-tank, J, having perforations or jet-holes $a$ near the lower portion of wall C, and ore agitating or stirring mechanism, in combination with an amalgamating plate or guard extending below the level at which the water discharges from the tank, substantially as described.

3. A tank or receptacle having end walls, E F, inclining walls B C, meeting at D, a water-tank, J, having perforations or jet-holes $a$ near the lower portion of wall C, and an amalgamating-plate, Z, on the inclining portion B, in combination with an ore agitating or stirring mechanism, all for the purpose specified.

In testimony whereof I have hereunto set my hand in the presence of two subscribing witnesses.

LEVI NEWCOMB.

Witnesses:
ALBERT W. BROWN,
FRANCES M. BROWN.